US011774600B2

(12) United States Patent
Ferguson et al.

(10) Patent No.: US 11,774,600 B2
(45) Date of Patent: Oct. 3, 2023

(54) METHOD AND DEVICE FOR POSITIONING USING ELECTROMAGNETIC INTERFERENCE THAT IS JAMMING NAVIGATION SIGNALS

(71) Applicant: The United States of America, as represented by the Secretary of the Navy, San Diego, CA (US)

(72) Inventors: Michael Oren Ferguson, San Diego, CA (US); Ceferino Teodoro Fajardo, III, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 48 days.

(21) Appl. No.: 17/546,940

(22) Filed: Dec. 9, 2021

(65) Prior Publication Data

US 2023/0184957 A1 Jun. 15, 2023

(51) Int. Cl.
*G01S 19/21* (2010.01)
*G01S 19/48* (2010.01)
*G01S 19/49* (2010.01)
*G01S 19/01* (2010.01)

(52) U.S. Cl.
CPC .............. *G01S 19/21* (2013.01); *G01S 19/48* (2013.01); *G01S 19/49* (2013.01); *G01S 19/015* (2013.01)

(58) Field of Classification Search
CPC .......... G01S 19/21; G01S 19/48; G01S 19/49; G01S 19/015

USPC .................. 342/457, 357.59, 357.31, 357.32
See application file for complete search history.

(56) References Cited

U.S. PATENT DOCUMENTS

| | | | | |
|---|---|---|---|---|
| 6,473,034 B2* | 10/2002 | Lin | ........................ | G01S 19/015 |
| | | | | 342/357.59 |
| 8,576,769 B2* | 11/2013 | Zheng | .................. | H04B 7/2041 |
| | | | | 370/316 |
| 9,287,940 B2* | 3/2016 | Lee | ........................ | H04B 7/0617 |
| 9,678,213 B2* | 6/2017 | Le Pera | .................... | G01S 5/04 |

(Continued)

FOREIGN PATENT DOCUMENTS

WO WO-2011083269 A1 * 7/2011 ............. G01S 19/21

*Primary Examiner* — Chuong P Nguyen
(74) *Attorney, Agent, or Firm* — Naval Information Warfare Center, Pacific; Kyle Eppele; James R. McGee

(57) ABSTRACT

A method and device determines an evolving position of a device using electromagnetic interference, which is jamming electromagnetic navigation signals. An antenna arrangement receives both the electromagnetic navigation signals and the electromagnetic interference. A discerned position is determined for each of one or more jamming antennas emitting the electromagnetic interference. A detection circuit determines each discerned position from the electromagnetic interference received at the device and at least one measurement of the evolving position using the electromagnetic navigation signals. The evolving position of the device is determined while the electromagnetic interference prevents subsequently measuring the evolving position using the electromagnetic navigation signals. An evaluation circuit determines the evolving position from the electromagnetic interference received at the device and from each discerned position of the one or more jamming antennas.

20 Claims, 5 Drawing Sheets

(56) References Cited

U.S. PATENT DOCUMENTS 10,330,791 B2 * 6/2019 Revol ................... H04K 3/22
10,743,262 B2 * 8/2020 Visotsky ............. H04W 52/283

* cited by examiner

METHOD AND DEVICE FOR POSITIONING USING ELECTROMAGNETIC INTERFERENCE THAT IS JAMMING NAVIGATION SIGNALS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 111470.

BACKGROUND OF THE INVENTION

Navigation signals, such as navigation signals from global positions system (GPS) satellites, provide accurate positioning, but are susceptible to jamming due to low received power from the typically long distances between the transmitter and the receiver and the limited transmit power of such navigation signals. There is a general need to provide accurate positioning despite such jamming.

SUMMARY

A method and device determines an evolving position of a device using electromagnetic interference, which is jamming electromagnetic navigation signals. An antenna arrangement receives both the electromagnetic navigation signals and the electromagnetic interference. A discerned position is determined for each of one or more jamming antennas emitting the electromagnetic interference. A detection circuit determines each discerned position from the electromagnetic interference received at the device and at least one measurement of the evolving position using the electromagnetic navigation signals. The evolving position of the device is determined while the electromagnetic interference prevents subsequently measuring the evolving position using the electromagnetic navigation signals. An evaluation circuit determines the evolving position from the electromagnetic interference received at the device and from each discerned position of the one or more jamming antennas.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
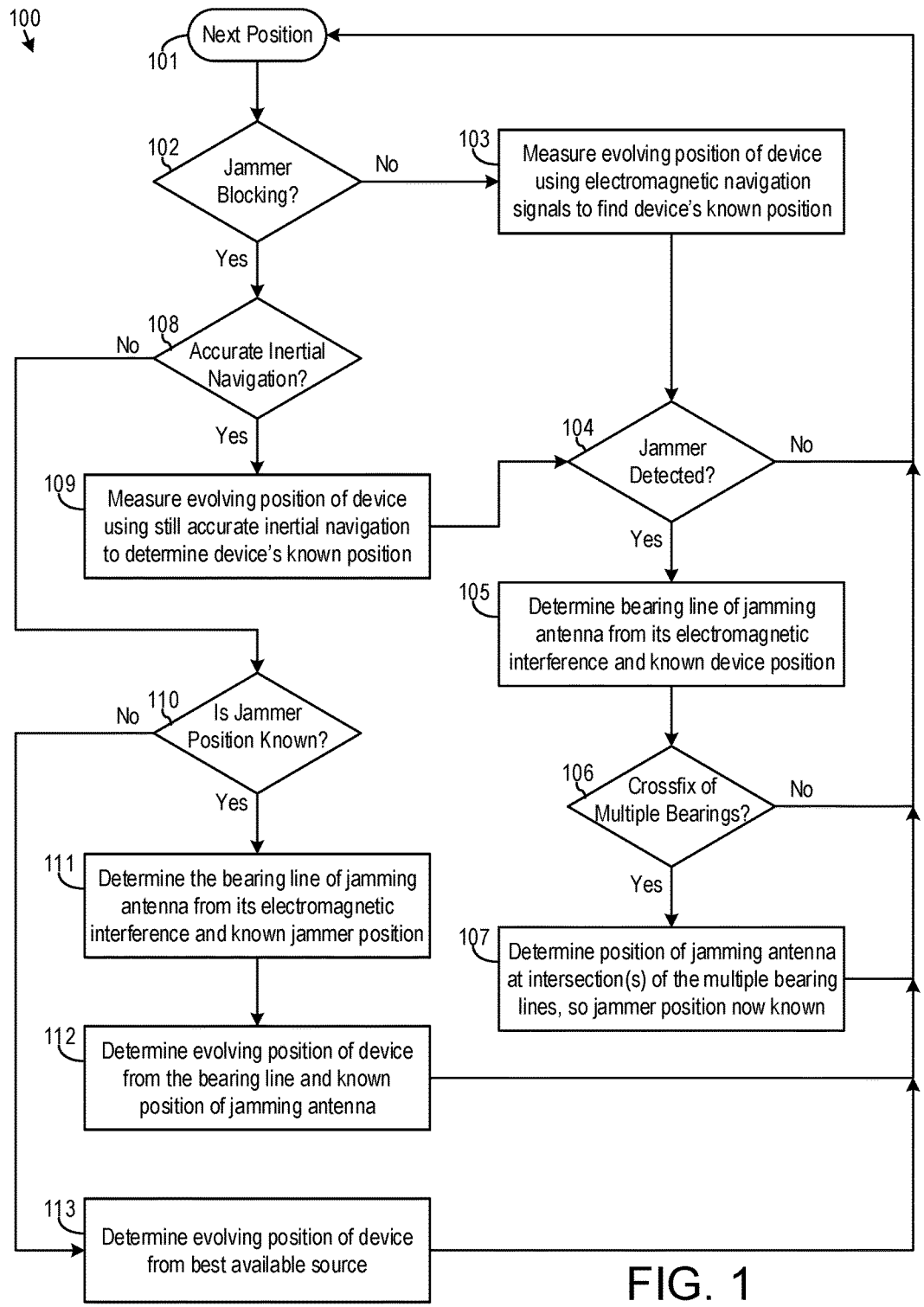
FIG. 1 is a flow diagram of a process for determining an evolving position of a device using electromagnetic interference that is jamming navigation signals in accordance with an embodiment of the invention.
Figure 2:
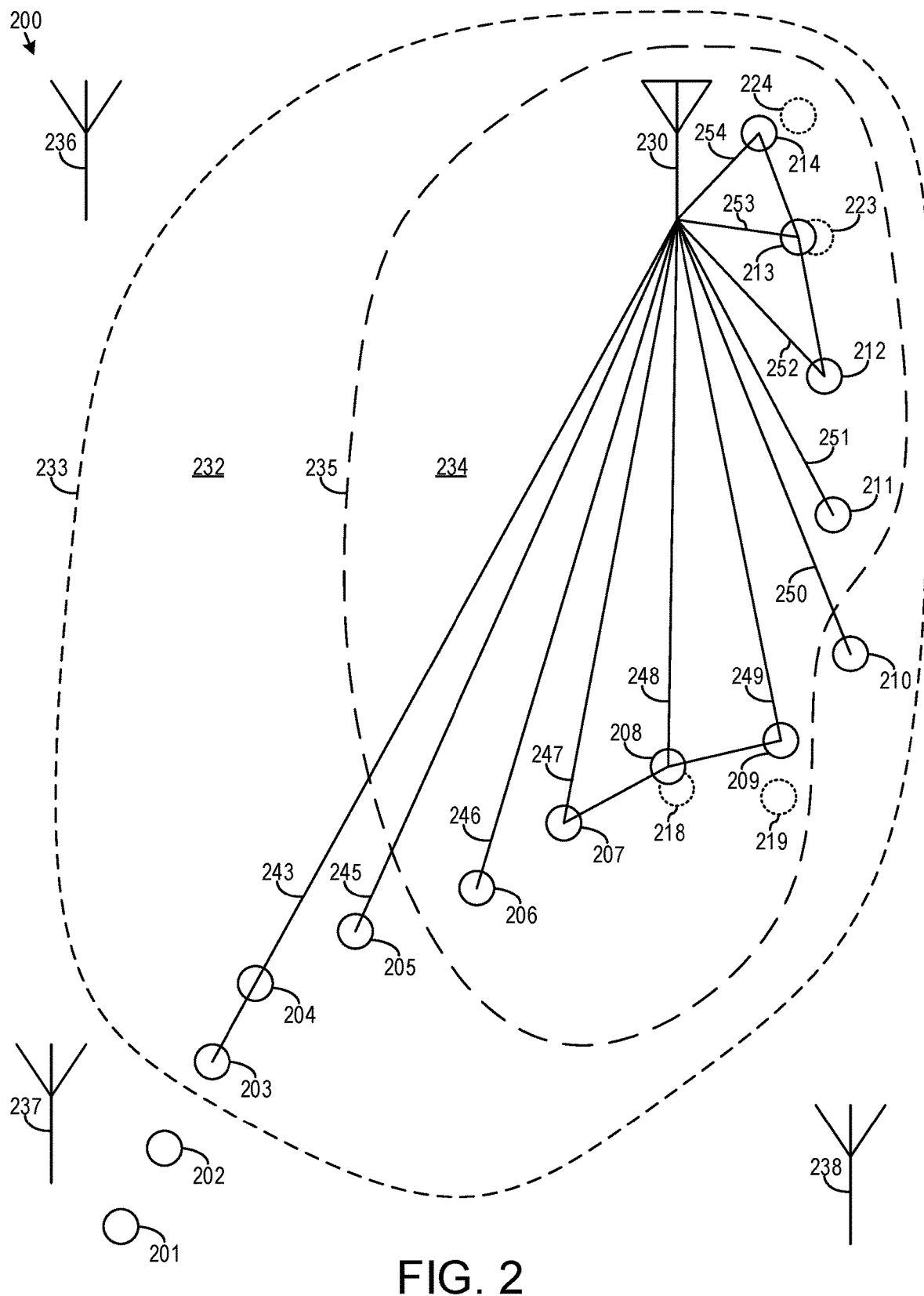
FIG. 2 is an example illustrating the determination of an evolving position of a device using electromagnetic interference that is jamming navigation signals in accordance with an embodiment of the invention.

FIG. 1 is a flow diagram of a process 100 for determining an evolving position of a device using electromagnetic interference that is jamming navigation signals in accordance with an embodiment of the invention. The operation of process 100 is described in conjunction with the example 200 of FIG. 2 illustrating the determination of an evolving position of a device using electromagnetic interference that is jamming navigation signals in accordance with an embodiment of the invention.

The device is initially disposed at position 201 of the evolving positions 201 through 214 of the device. The initial position 201 is outside the regions 232 and 234 of influence of jamming antenna 230. The jamming antenna 230 is detectable in region 232 within boundary 233, and the jamming antenna 230 jams the electromagnetic navigation signals in region 234 within boundary 235. The electromagnetic navigation signals originate, for example, from global positioning system (GPS) satellites 236, 237, and 238. Referring to FIG. 1, the position 201 is initially the next position 101, and decision 102 determines the jamming antenna 230 is not blocking the electromagnetic navigation signals at initial position 201, so process 100 proceeds to step 103. Step 103 measures the initial position 201 of the evolving position of the device using the electromagnetic navigation signals before detecting any electromagnetic interference from the jamming antenna 230 at decision 104. Thus, process 100 returns from decision 104 to consider the next position 101 of evolving position of the device.

Next, the device is disposed at position 202, which is still outside the regions 232 and 234 of influence of jamming antenna 230. Thus, decision 102 determines the jamming antenna 230 is not blocking the electromagnetic navigation signals. Step 103 measures position 202 of the evolving position of the device using the electromagnetic navigation signals. Decision 104 does not detect the jamming antenna 230, and process 100 returns to await the next position 101.

Next, the device is disposed at position 203, which inside the region 232 in which jamming antenna 230 is detectable, but outside jamming region 234 of jamming antenna 230. Hence, the device can begin characterizing the jamming antenna 230 while the electromagnetic navigation signals are still functional. Decision 102 determines the jamming antenna 230 is not blocking the electromagnetic navigation signals, so process 100 proceeds to step 103 that measures position 203. At decision 104, jamming antenna 230 is detected and process 100 proceeds to step 105. After detecting the electromagnetic interference from the jamming antenna 230, step 105 determines a bearing along line 243 from jamming antenna 230 to position 203 of the electromagnetic interference received at the device from the jamming antenna 230. The bearing and position 203 of this line 243 are saved for later calculation of the position of the jamming antenna 230 at step 107. Decision 106 checks whether multiple independent bearing lines have been measured. Because only one bearing line 243 is measured, process 100 returns to the next position 101.

Next, the device is disposed at position 204. Decision 102 again determines the jamming antenna 230 is not blocking measurement of position 204 using the electromagnetic navigation signals at step 103, and decision 104 detects the electromagnetic interference from the jamming antenna 230. At step 105, a bearing of the electromagnetic interference received at the device from the jamming antenna 230 is measured along the same line 243 from jamming antenna 230 to both positions 203 and 204. For discussion purposes, this illustrates the unusual situation where the course of travel of the device is directly towards the jamming antenna 230. Because the twice-measured bearing line 243 counts as only one bearing line 243, process 100 returns from decision 106 to the next position 101. In response to this degenerate situation, the device alters course to enable complete characterization of the jamming antenna 230.

Because the device altered course the device is next disposed at position 205. After decision 102, step 103 measures position 205 using the electromagnetic navigation signals, and after decision 104, step 105 measures a bearing of the electromagnetic interference received at the device from the jamming antenna 230 along the line 245 from jamming antenna 230 to position 205. The bearing and position 205 of this line 245 are saved for later calculation of the position of the jamming antenna 230 at step 107. Because these saved bearing lines now define multiple independent bearings sufficient to calculate the discerned position of the jamming antenna 230, process 100 proceeds from decision 106 to step 107. Step 107 triangulates the discerned position of the jamming antenna 230 at the intersections between the independent bearing lines 243 and 245.

Next, the device is disposed at position 206 inside jamming region 234 of jamming antenna 230. Thus, decision 102 determines the jamming antenna 230 is blocking the electromagnetic navigation signals, and process 100 proceeds to decision 108 that checks whether inertial navigation is accurate.

Inertial navigation is typically very accurate in the short term, but drifts away from accuracy in the long term. An example inertial navigation system measures linear and angular accelerations, integrates these accelerations to yield linear and angular velocities, and integrates these velocities to yield position and orientation. Due to the double integration, any small errors in measuring the accelerations yield increasingly diverging errors in the position. For discussion purposes, the inertial navigation is shown accurate for two successive positions 206 and 207, but without correction for drift, the inertial navigation would subsequently drift to drifted position 218 away from the actual position 208 and drifted position 219 away from the actual position 209. It will be appreciated than in a device without an inertial navigation system, process 100 proceeds directly from decision 102 to decision 110.

Because the inertial navigation is accurate at position 206, process 100 proceeds from decision 108 to step 109. At step 109, the inertial navigation extrapolates the position 205 and a velocity previously measured using the electromagnetic navigation signals at step 103 into an accurate measurement of the position 206. Then because the jamming antenna 230 is generally detected at decision 104 during active jamming, step 105 measures a bearing of the jamming antenna 230 along the line 246 from jamming antenna 230 to position 206. Because there are multiple bearings at decision 106, step 107 triangulates the discerned position of the jamming antenna 230 at the intersections between the independent bearing lines 243, 245, and 246. This triangulation through successively determined bearing lines 243, 245, and 246 enables determining whether the jamming antenna 230 is stationary or moving. Further, when the jamming antenna 230 is stationary, the scatter plot of triangulation intersections is averaged to increase the accuracy of the discerned position of the jamming antenna 230 in an embodiment. For example, an expected accuracy is determined for each triangulation intersection and a weighted mean averages the triangulation intersections with weights according to their expected accuracies.

Similarly, at position 207, the inertial navigation system extrapolates a measurement of position 207. A bearing of the jamming antenna 230 is measured along the line 247 from jamming antenna 230 to position 207. Step 107 triangulates the discerned position of the jamming antenna 230 at the intersections between the independent bearing lines 243, 245, 246, and 247 to further increase the accuracy of the discerned position of the jamming antenna 230.

At position 208, the jamming antenna 230 is still jamming the electromagnetic navigation signals, but the inertial navigation is no longer accurate, so process 100 proceeds through decisions 102 and 108. Since inertial navigation is no longer accurate, process 100 proceeds to decision 110. Decision 110 checks whether the position of the jamming antenna 230 is known. Because the discerned position of the jamming antenna 230 is known from the triangulations of step 107 over the bearing lines 243, 245, 246, and 247, process 100 proceeds to step 111.

While the electromagnetic interference prevents measuring the position 208 using either the electromagnetic navigation signals or an inertial navigation system, step 111 measures, at initially unknown position 208, a bearing along line 248 of the electromagnetic interference received at the device from the jamming antenna 230. Then step 112 determines the position 208 of the device from bearing along line 248 and the discerned position of the jamming antenna 230. To determine position 208, step 112 uses the known position of the jamming antenna 230, the bearing line 248 from the jamming antenna 230, and the position 207 with bearing line 247, forming a triangle with a baseline from position 207 to position 208. In one embodiment, the heading is determined from a compass and/or the inertial navigation system, and the distance between positions 207 and 208 is determined from the inertial navigation system's dead reckoning.

Similarly, at position 209, after traversing decisions 102, 108, and 110 to step 111, steps 111 and 112 measure the bearing along line 249 of the electromagnetic interference received at the device from the jamming antenna 230, and triangulate the device's position 209 from the discerned position of the jamming antenna 230 and the measured bearing along line 249.

Next, at position 210, the device exits the region 234 in which jamming antenna 230 jams the electromagnetic navigation signals. Thus, step 103 measures the position 210 of the device using the electromagnetic navigation signals, and step 105 measures the bearing along line 250 of the electromagnetic interference received at the device from the jamming antenna 230. The drift in the inertial navigation system is corrected with the measured position 210, so subsequent jammed positions 211 and 212 are determined from the accurate inertial navigation system at step 109 and the bearings along lines 251 and 252 are measured at step 105. The collection of saved independent bearings between the jamming antenna 230 and known positions increases to the seven independent bearings of line 243 though position 204, line 245 though position 205, line 246 though position 206, line 247 though position 207, line 250 though position 210, line 251 though position 211, and line 252 though position 212. Note that of these seven bearing lines, the latter ones are expected to have higher accuracy because the device is closer to the jamming antenna 230, the latter ones intersect at angles closer to perpendicular, and the latter ones are more recently measured. In one embodiment, the discerned position of the jamming antenna 230 at step 107 is a weighted mean of the intersections among the seven saved bearing lines with weights according to these expected accuracies.

At positions 213 and 214, the inertial navigation system is no longer accurate and predicts drifted position 223 away from the actual position 213 and drifted position 224 away from the actual position 214. Thus, while the electromagnetic interference from jamming antenna 230 prevents accurately measuring the positions 213 and 214 using either the electromagnetic navigation signals or the inertial navigation system, bearing lines 253 and 254 through positions 213 and 214 are determined from the electromagnetic interference received at the device at step 111, and then, at step 112, positions 213 and 214 are determined from the bearing lines 253 and 254 and from the discerned position of the jamming antenna 230 previously determined at step 107 from the seven saved bearing lines.

In another example not shown in FIG. 2, immediately upon detecting the electromagnetic interference from the jamming antenna, the electromagnetic interference from the jamming antenna prevents measuring the evolving position using the electromagnetic navigation signals. For example, a nearby jamming antenna switches on from inactive to active jamming, or relative movement brings the jamming antenna into view from behind terrain. Suppose further that the device does not include an inertial navigation system. In such an example, process 100 proceeds through decisions 102 and 108 to decision 110. Because no bearings to the jamming antenna have been taken, process 100 proceeds to step 113. At step 113, because the position of the jamming antenna remains unknown, the position of the device is determined from the best otherwise available source.

Figure 3:
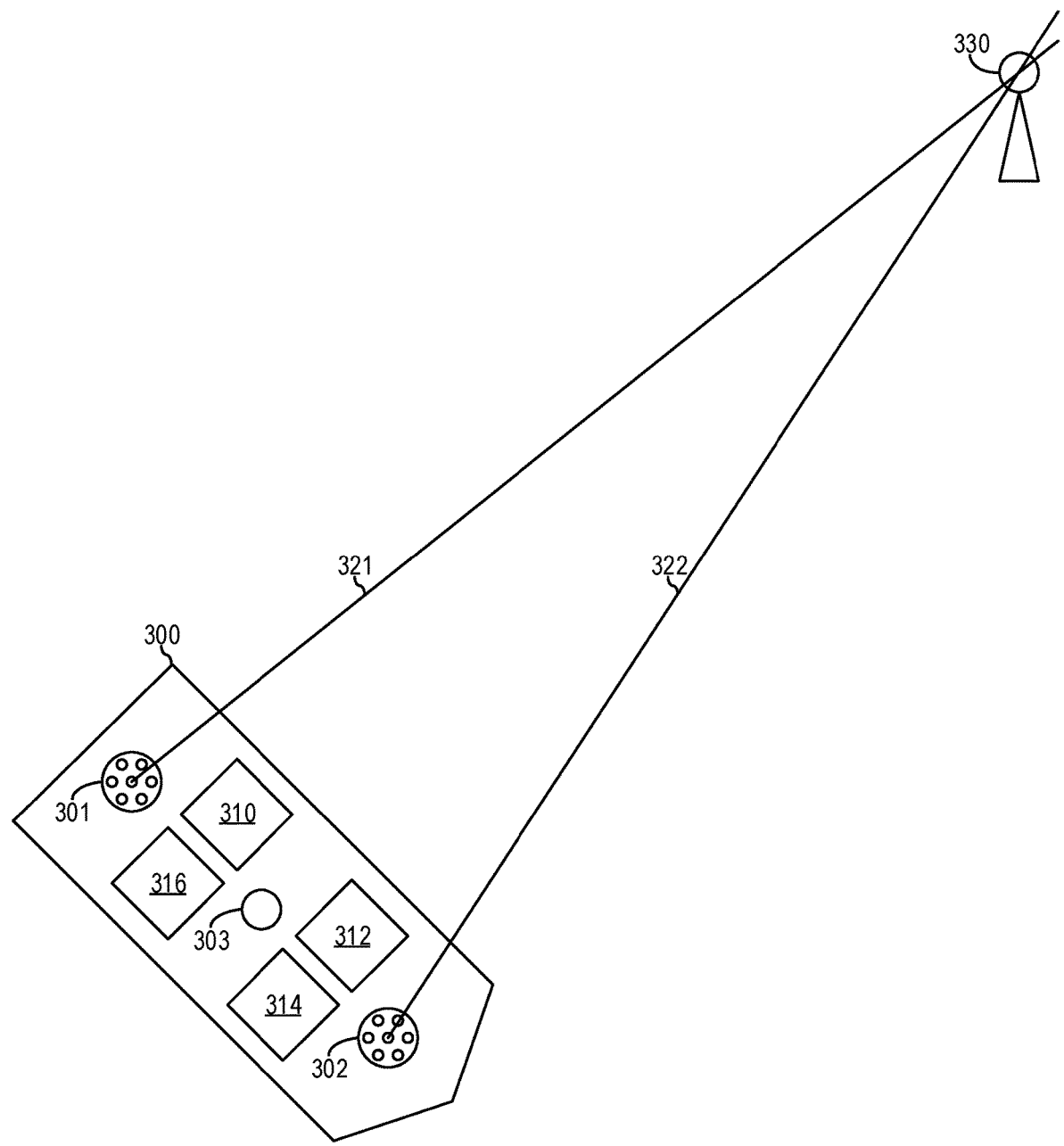
FIG. 3 is a block diagram illustrating a device for determining an evolving position of the device using electromagnetic interference that is not yet jamming navigation signals in accordance with an embodiment of the invention.

FIG. 3 is a block diagram illustrating a device 300 for determining an evolving position of the device 300 using electromagnetic interference that is not yet jamming electromagnetic navigation signals in accordance with an embodiment of the invention. A jamming antenna 330 emits the electromagnetic interference that the device 300 detects, but the electromagnetic interference does not yet jam the electromagnetic navigation signals in FIG. 3.

The device 300 includes an antenna arrangement, and in this embodiment the antenna arrangement includes a first antenna 301 disposed at the first position on the device 300 and a second antenna 302 disposed at the second position on the device 300. The device 300 further includes a correlation circuit 310, a detection circuit 312, an evaluation circuit 314, and an optional inertial navigation system 316.

In this embodiment, the evolving position is fixed on the device 300 relative to the first and second antennas 301 and 302 of the moving device 300; for example, the evolving position 303 is midway between the first antenna 301 and the second antenna 302. It will be appreciated that the evolving position is referenced anywhere relative to the device 300, such as on the bridge of a ship or the cab of a vehicle that includes the device 300.

Each antenna 301 and 302 of the antenna arrangement receives both the electromagnetic navigation signals and the electromagnetic interference from the jamming antenna 330.

The electromagnetic navigation signals received at each of antennas 301 and 302 are routed to the correlation circuit 310 for measuring the first position of the first antenna 301 and measuring the different second position of the second antenna 302. For example, the correlation circuit 310 measures the first and different second positions of the first and second antennas 301 and 302 from electromagnetic navigation signals received at the antenna arrangement from global positioning system (GPS) satellites while the electromagnetic interference from the jamming antenna 330 does not yet prevent such measurements. The correlation circuit 310 measures the first position of the first antenna 301 from the electromagnetic navigation signals received at the first antenna 301 and measures the second position of the second antenna 302 from the electromagnetic navigation signals received at the second antenna 302.

In one embodiment, each antenna 301 and 302 includes an array of elements. The detection circuit 312 matches a wavefront phase of the electromagnetic interference across the elements of each individual antenna 301 and 302. The matched wavefront phase specifies a bearing of a respective line 321 and 322 from the jamming antenna 330 to the individual antennas 301 and 302. Alternatively or in addition, the detection circuit 312 detects any modulation of the electromagnetic interference from the jamming antenna 330, and, for pinpointing the discerned position of the jamming antenna 330, correlates the modulation between the elements of each antenna 301 and 302 and/or between the two antennas 301 and 302. Typically, the bearing between the jamming antenna 330 and each individual antenna 301 and 302 includes an azimuth angle and an elevation angle. For example, the bearing 322 includes an azimuth angle from a heading direction of a ship carrying the device 300 and an elevation angle above a horizon plane of a deck of the ship.

For an antenna arrangement with two antennas 301 and 302, a single simultaneous measurement of the bearing line 321 from the jamming antenna 330 to antenna 301 and the bearing line 322 from the jamming antenna 330 to antenna 302 is sufficient to discern the position of the jamming antenna 330 in azimuth and elevation relative to the device 300. In addition, because the measured first position of first antenna 301 and the simultaneously measured second position of the second antenna 302 specifies the pitch and heading of the device 300, the single simultaneous measurement of the bearing lines 321 and 322 is nearly enough to globally define the position, including altitude, of the jamming antenna 330. However, the roll angle of the device 300 around an axis through the two antennas 301 and 302 remains indeterminate with a single simultaneous measurement from just two antennas 301 and 302. This ambiguity is eliminated with additional measurements, such as with inertial navigation 314, subsequently measuring additional bearing lines after movement of the device 300, simultaneous measurements from a third antenna, or measuring the roll angle by measuring the direction of gravity.

The detection circuit 312 determines the discerned position of the jamming antenna 330 from the bearing lines 321 and 322 between the jamming antenna 330 and each individual antenna 301 and 302 of the antenna arrangement, and from measurement of the evolving position using the electromagnetic navigation signals received at the antenna arrangement. The detection circuit 312 measures a first bearing along line 321 of the electromagnetic interference received at the first antenna 301 from the jamming antenna 330, and measures a second bearing along line 322 of the electromagnetic interference received at the second antenna 302 from the jamming antenna 330. The detection circuit 312 triangulates the discerned position of the jamming antenna 330 at an intersection between the measured bearing line 321 though the measured first position of the first antenna 301 and the measured bearing line 322 though the measured second position of the second antenna 302. In three-dimensional space, these bearing lines 321 and 322 might not accurately intersect due to measurement errors, but then the discerned position of the jamming antenna 330 is determined as the midpoint of the shortest line segment connecting the bearing lines 321 and 322. Additional bearing lines determined after movement of the device 300 and before successful jamming further define the discerned position of the jamming antenna 330.

Figure 4:
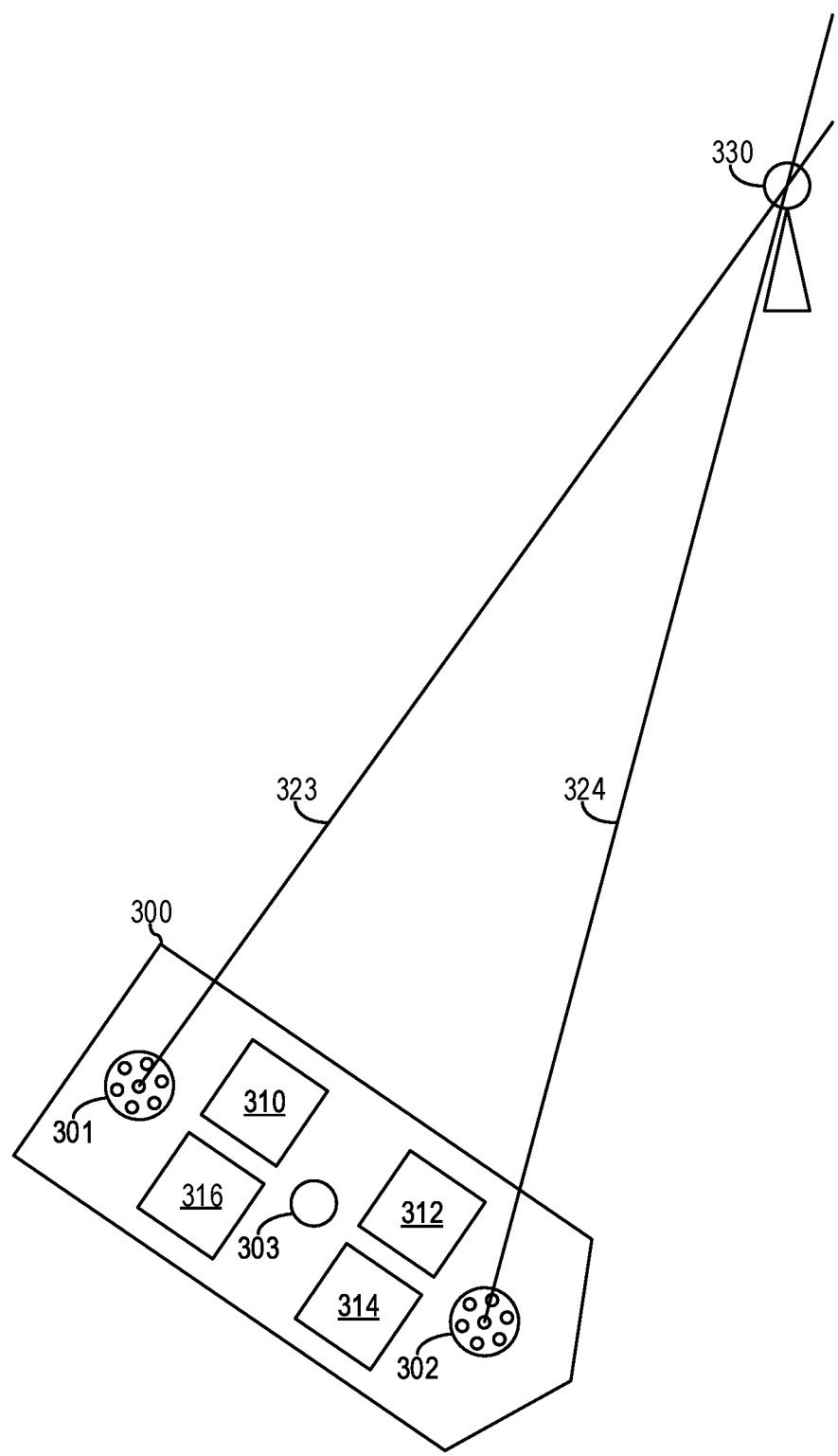
FIG. 4 is a block diagram illustrating a device for determining an evolving position of the device using electromagnetic interference that is jamming navigation signals in accordance with an embodiment of the invention.

FIG. 4 is a block diagram illustrating a device 300 for determining an evolving position of the device 300 using electromagnetic interference that is jamming navigation signals in accordance with an embodiment of the invention. After discerning the position of jamming antenna 330 as shown in FIG. 3, the device 300 subsequently moves to the evolving position shown in FIG. 4 while the jamming antenna 330 remains stationary. The evolving position of device 300 of FIG. 4 is closer to the jamming antenna 330 than the evolving position of device 300 of FIG. 3, and hence the electromagnetic interference from jamming antenna 330 prevents measuring the evolving position using the electromagnetic navigation signals.

In response to this successful jamming, the evaluation circuit 314 determines the evolving position of the device 300 from the electromagnetic interference received at the antenna arrangement of antennas 301 and 302 and from the discerned position of the jamming antenna 330. The evaluation circuit 314 measures a bearing along line 323 of the electromagnetic interference received from the jamming antenna 330 at the subsequent position of antenna 301 of the device 300. The evaluation circuit 314 similarly measures a bearing along line 324 through the subsequent position of antenna 302. Typically, each bearing line 323 and 324 includes an azimuth angle and an elevation angle in a coordinate system of the device 300. The evaluation circuit 314 triangulates the subsequent position of the evolving position 303 of the device 300 from the discerned position of the jamming antenna 330, the bearing lines 323 and 324 between the discerned position of the jamming antenna 330 and each of antennas 301 and 302 at their subsequent positions, and the known distance between the antennas 301 and 302.

For an antenna arrangement with two antennas 301 and 302, a single simultaneous measurement of the bearing line 323 from the jamming antenna 330 to antenna 301 and the bearing line 324 from the jamming antenna 330 to antenna 302 is sufficient to determine the distance between the jamming antenna 330 and the device 300, and also to determine the direction in azimuth and elevation between the jamming antenna 330 and the device 300 in a coordinate system of the device 300. However, the single simultaneous measurement of the bearing lines 323 and 324 from the discerned position of the jamming antenna 330 does not globally define the heading, pitch, or roll angle of the device 300. This ambiguity is eliminated with additional measurements, such as subsequently measuring additional bearing lines after movement of the device 300, simultaneous measurements from a third antenna, or measurements of the inertial navigation system 316.

The inertial navigation system 316 includes, for example, vibrating test masses for measuring linear and angular accelerations, mechanical or optical gyroscopes for measuring orientation, a flux gate compass for measuring heading, and a sensor measuring the direction of gravity. The inertial navigation system 316 extrapolates a first position and a velocity of the device 300 and its antennas 301 and 302 at a first time as shown in FIG. 3 into the different second position at a second time of FIG. 4.

Refer back to FIG. 1 for the process 100 of determining the evolving position of the device 300 having antennas 301 and 302 that concurrently receive both of the electromagnetic navigation signals and the electromagnetic interference as shown in FIG. 3 and FIG. 4.

At step 103, the first and second antennas 301 and 302 concurrently measure a first and different second position when the first and second antennas 301 and 302 are respectively disposed at the first and second positions. The first antenna 301 measures the first position of the first antenna 301 using the electromagnetic navigation signals received at the first antenna 301, and the second antenna 302 concurrently measures the second position of the second antenna 302 using the electromagnetic navigation signals received at the second antenna 302.

At step 105, the first and second antennas 301 and 302 concurrently measure a first and second bearing. The first antenna 301 concurrently measures the first bearing along line 321 of the electromagnetic interference received at the first antenna 301 from the jamming antenna 330. The second antenna 302 concurrently measures the second bearing along line 322 of the electromagnetic interference received at the second antenna 302 from the jamming antenna 330.

At step 107, the discerned position of the jamming antenna 330 is triangulated at an intersection between the line 321 though the first position at the first bearing and the line 322 though the second position at the second bearing.

At step 111, while the electromagnetic interference prevents subsequently measuring the evolving position using the electromagnetic navigation signals, the first and second antennas 301 and 302 concurrently measure a third and fourth bearing along lines 323 and 324 when the first and second antennas 301 and 302 are respectively disposed at a third and fourth position. The first antenna 301 concurrently measures the third bearing along line 323 of the electromagnetic interference received at the first antenna 301 from the jamming antenna 330. The second antenna 302 concurrently measures the fourth bearing along line 324 of the electromagnetic interference received at the second antenna 302 from the jamming antenna 330. At step 112, the third and fourth positions of the evolving position of the device 300 are triangulated from the discerned position of the jamming antenna 330, the line 323 at the third bearing through the discerned position and the third position, and the line 324 at the fourth bearing through the discerned position and the fourth position.

In another embodiment, the antenna 302 is omitted and a single antenna 301 of the device 300 receives both the electromagnetic navigation signals and the electromagnetic interference from the jamming antenna 330. The discerned position of the jamming antenna 330 is determined from the electromagnetic interference received by the antenna 301 and one or more measurements of the evolving position using the electromagnetic navigation signals received by the antenna 301. Subsequently, the evolving position of the device 300 is determined from the electromagnetic interference received by the antenna 301. In one embodiment, the electromagnetic interference is received at an array of elements of the antenna 301 and a wavefront phase of the electromagnetic interference is matched across the elements. The matched wavefront phase specifies a bearing of a line 321 or 323 from the jamming antenna 330 to the antenna 301, the bearing including an azimuth angle and an elevation angle.

The evolving position of the device 300 includes a first position at a first time of FIG. 3, a second position at the second time when the jamming antenna 330 is still does not jam the electromagnetic navigation signals (not shown), a third position at a third time of FIG. 4, and a fourth position at a fourth time when the jamming antenna 330 continues jamming the electromagnetic navigation signals (not shown).

At the first time when the device 300 is disposed at the first position of FIG. 3, the correlation circuit 310 measures the first position using the electromagnetic navigation signals received at the antenna 301. The detection circuit 312 measures a first bearing along line 321 for the electromagnetic interference received at the antenna 301 from the jamming antenna 330. At a second time when the device 300 is disposed at a different second position (not shown), the correlation circuit 310 subsequently measures the second position using the electromagnetic navigation signals received at the antenna 301. The detection circuit 312 measures a second bearing for the electromagnetic interference received at the antenna 301 from the jamming antenna 330. The detection circuit 312 triangulates a discerned position of the jamming antenna 330 at an intersection between the bearing line 321 though the first position at the first bearing and the bearing line though the second position at the second bearing.

The evaluation circuit 314 determines the evolving position of the device 300 while the electromagnetic interference prevents subsequently measuring the evolving position using the electromagnetic navigation signals. At the third time when the device 300 is disposed at the third position of FIG. 4, the evaluation circuit 314 measures a third bearing along line 323 for the electromagnetic interference received at the device 300 from the jamming antenna 330. At the fourth time when the device is disposed at a different fourth position (not shown), the evaluation circuit 314 subsequently measures a fourth bearing for the electromagnetic interference received at the device 300 from the jamming antenna 330. The evaluation circuit 314 triangulates the third and fourth positions of the evolving position of the device 300 from the discerned position of the jamming antenna 330, the line 323 at the third bearing through the discerned position and the third position, and a line at the fourth bearing through the discerned position and the fourth position.

Figure 5:
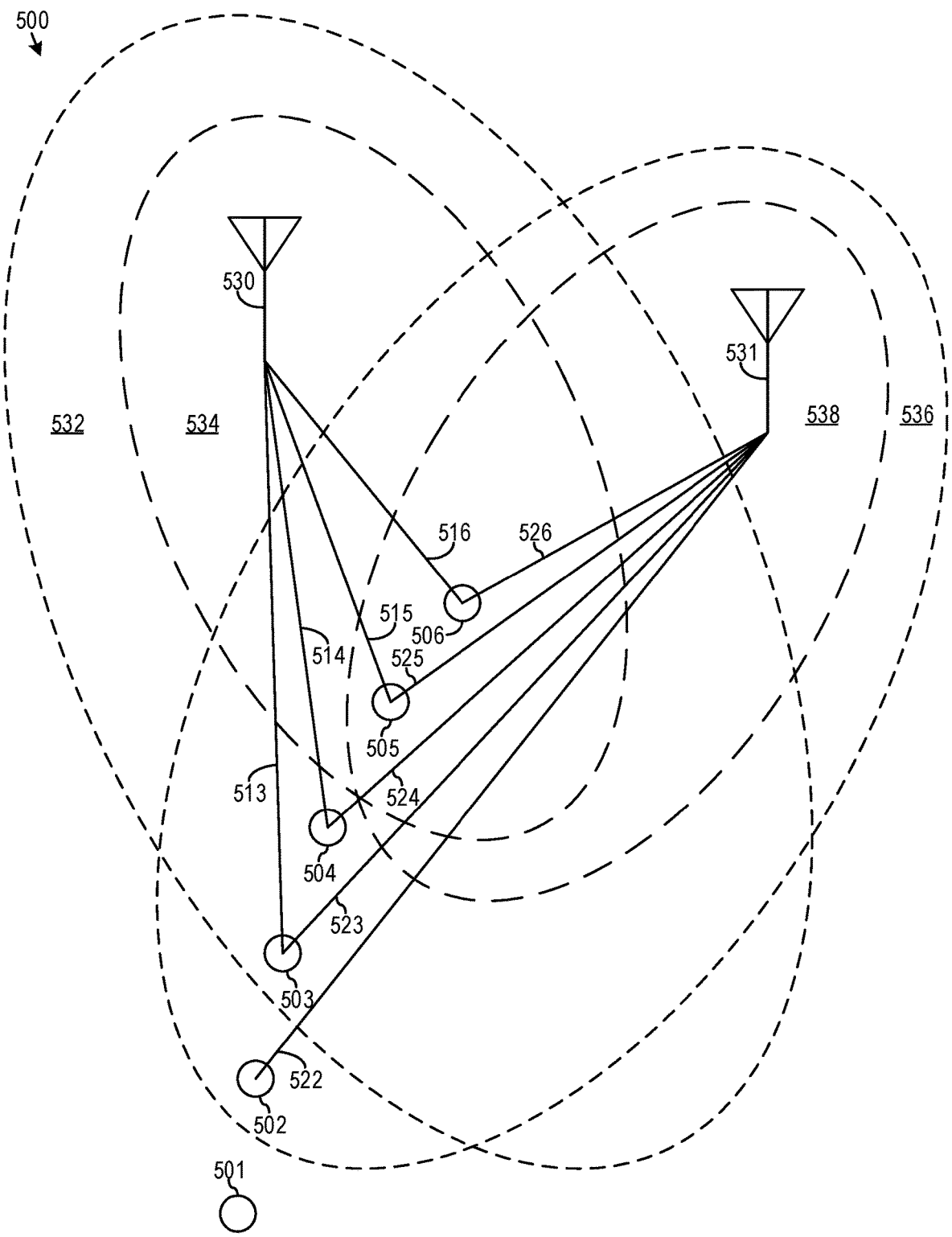
FIG. 5 is an example illustrating the determination of an evolving position of a device using electromagnetic interference from multiple jamming antennas in accordance with an embodiment of the invention.

FIG. 5 is an example 500 illustrating the determination of an evolving position of a device using electromagnetic interference from multiple jamming antennas 530 and 531 in accordance with an embodiment of the invention. The evolving position of the device includes positions 501 through 506.

Position 501 is outside the regions 532 and 534 of influence of jamming antenna 530 and outside the regions 536 and 538 of influence of jamming antenna 531. Position 501 is determined using the electromagnetic navigation signals.

Positions 502, 503, and 504 are outside the jamming regions 534 and 538 of jamming antennas 530 and 531, but position 502 is inside the detection region 536 of jamming antenna 531 and positions 503 and 504 are inside both the detection regions 532 and 536 of jamming antennas 530 and 531. Thus, positions 502, 503, and 504 are measured using the electromagnetic navigation signals. Also measured at positions 502, 503, and 504 are the bearing line 522, the bearing lines 513 and 523, and the bearing lines 514 and 524 to the jamming antennas 530 and 531.

Subsequent positions 505 and 506 are inside the jamming regions 534 and 538 of jamming antennas 530 and 531. Thus, the electromagnetic navigation signals cannot determine the positions 505 and 506. In this example 500, the device does not include an inertial navigation system.

However, a respective position is already discerned for each of the jamming antennas 530 and 531 emitting the electromagnetic interference. The discerned position of jamming antenna 530 is known from triangulating between the bearing lines 513 and 514, and the discerned position of jamming antenna 531 is known from triangulating among the bearing lines 522, 523, and 524.

At position 505 of the device, the bearing line 515 is measured for the electromagnetic interference received at the device from the jamming antenna 530, and the bearing line 525 is measured for the electromagnetic interference received at the device from the jamming antenna 531. The position 505 of the evolving position of the device is triangulated at an intersection between the respective bearing line 515 passing though the discerned position of the jamming antenna 530 and the respective bearing line 525 passing though the discerned position of the jamming antenna 531. Typically, the bearing lines 515 and 525 each include an azimuth angle and an elevation angle. A single simultaneous measurement of the bearing lines 515 and 525 is sufficient to globally define the position 505 of the device from the previously discerned positions of the jamming antennas 530 and 531.

Subsequent position 506 is similarly measured from the bearing lines 516 and 526 and from the previously discerned positions of the jamming antennas 530 and 531.

From the above description of Method and Device for Positioning Using Electromagnetic Interference that is Jamming Navigation Signals, it is manifest that various techniques may be used for implementing the concepts of method 100 and device 300 without departing from the scope of the claims. The described embodiments are to be considered in all respects as illustrative and not restrictive. The method/device disclosed herein may be practiced in the absence of any element that is not specifically claimed and/or disclosed herein. It should also be understood that method 100 or device 300 is not limited to the particular embodiments described herein, but is capable of many embodiments without departing from the scope of the claims.

We claim:

1. A method for determining an evolving position of a device using electromagnetic interference, which is jamming a plurality of electromagnetic navigation signals, the method comprising:

determining a discerned position of at least one jamming antenna emitting the electromagnetic interference from the electromagnetic interference received at the device and at least one measurement of the evolving position using the electromagnetic navigation signals; and while the electromagnetic interference prevents subsequently measuring the evolving position using the electromagnetic navigation signals, determining the evolving position of the device from the electromagnetic interference received at the device and the discerned position of the at least one jamming antenna.

2. The method of claim 1, wherein:
the determining of the discerned position includes:
   receiving both the electromagnetic interference and the electromagnetic navigation signals at a same antenna of the device; and
   determining the discerned position of the jamming antenna from the electromagnetic interference received by the same antenna and the at least one measurement of the evolving position using the electromagnetic navigation signals received by the same antenna; and
the determining of the evolving position of the device includes:
   the receiving of the electromagnetic interference at the same antenna of the device; and
   determining the evolving position of the device from the electromagnetic interference received by the same antenna of the device.

3. The method of claim 2, wherein the receiving of the electromagnetic interference at the same antenna of the device for both the determining of the discerned position and the determining of the evolving position of the device includes:
   receiving the electromagnetic interference at an array of elements of the same antenna; and
   matching a wavefront phase of the electromagnetic interference across the elements,
   wherein the matched wavefront phase specifies a bearing of a line from the jamming antenna to the same antenna, the bearing between the jamming and same antennas including an azimuth angle and an elevation angle.

4. The method of claim 1, wherein the determining of the discerned position includes:
   before detecting the electromagnetic interference from the jamming antenna, measuring the at least one measurement that is a plurality of measurements of the evolving position of the device using the electromagnetic navigation signals; and
   after detecting the electromagnetic interference from the jamming antenna, determining the discerned position of the jamming antenna from the electromagnetic interference received at the device from the jamming antenna and the plurality of measurements of the evolving position of the device.

5. The method of claim 1, wherein:
the determining of the discerned position includes upon detecting the electromagnetic interference from the jamming antenna:
   measuring the evolving position of the device at a first position of the device using the electromagnetic navigation signals;
   measuring, at the first position, a first bearing of the electromagnetic interference received at the device from the jamming antenna;
   measuring the evolving position of the device at a different second position of the device using the electromagnetic navigation signals;
   measuring, at the second position, a second bearing of the electromagnetic interference received at the device from the jamming antenna; and
   triangulating the discerned position of the jamming antenna at an intersection between a line though the first position at the first bearing and a line though the second position at the second bearing; and the determining of the evolving position of the device while the electromagnetic interference prevents subsequently measuring the evolving position using the electromagnetic navigation signals includes:
   measuring, at a third position, a third bearing of the electromagnetic interference received at the device from the jamming antenna; and
   triangulating the third position of the evolving position of the device from the discerned position of the jamming antenna and a line at the third bearing through the discerned position and the third position.

6. The method of claim 1, further comprising:
concurrently receiving both of the electromagnetic navigation signals and the electromagnetic interference at each of a first and second antenna of the device, wherein the evolving position of the device is fixed relative to the first and second antennas,
wherein the determining of the discerned position includes:
   concurrently measuring a first and different second position and a first and second bearing with the first and second antennas when the first and second antennas are respectively disposed at the first and second positions, wherein the first antenna measures the first position using the electromagnetic navigation signals and measures the first bearing of the electromagnetic interference received at the first antenna from the jamming antenna, and the second antenna measures the second position using the electromagnetic navigation signals and measures the second bearing of the electromagnetic interference received at the second antenna from the jamming antenna, and
   triangulating the discerned position of the jamming antenna at an intersection between a line though the first position at the first bearing and a line though the second position at the second bearing, and
wherein the determining of the evolving position of the device while the electromagnetic interference prevents subsequently measuring the evolving position using the electromagnetic navigation signals includes:
   concurrently measuring a third and fourth bearing with the first and second antennas when the first and second antennas are respectively disposed at a third and fourth position, wherein the first antenna measures the third bearing of the electromagnetic interference received at the first antenna from the jamming antenna, and the second antenna measures the fourth bearing of the electromagnetic interference received at the second antenna from the jamming antenna, and
   triangulating the third and fourth positions of the evolving position of the device from the discerned position of the jamming antenna, a line at the third bearing through the discerned position and the third position, and a line at the fourth bearing through the discerned position and the fourth position.

7. The method of claim 6, wherein the evolving position is midway between the first antenna and the second antenna.

8. The method of claim 1, wherein:
the determining of the discerned position includes:
   at a first time when the device is disposed at a first position, measuring the first position using the electromagnetic navigation signals and measuring a first bearing of the electromagnetic interference received at the device from the jamming antenna;

at a second time when the device is disposed at a different second position, subsequently measuring the second position using the electromagnetic navigation signals and measuring a second bearing of the electromagnetic interference received at the device from the jamming antenna; and triangulating the discerned position of the jamming antenna at an intersection between a line though the first position at the first bearing and a line though the second position at the second bearing; and the determining of the evolving position of the device while the electromagnetic interference prevents subsequently measuring the evolving position using the electromagnetic navigation signals includes:

at a third time when the device is disposed at a third position, measuring a third bearing of the electromagnetic interference received at the device from the jamming antenna;

at a fourth time when the device is disposed at a different fourth position, subsequently measuring a fourth bearing of the electromagnetic interference received at the device from the jamming antenna; and triangulating the third and fourth positions of the evolving position of the device from the discerned position of the jamming antenna, a line at the third bearing through the discerned position and the third position, and a line at the fourth bearing through the discerned position and the fourth position, wherein the evolving position of the device includes the first position at the first time, the second position at the second time, the third position at the third time, and the fourth position at the fourth time.

9. The method of claim 1, wherein the electromagnetic navigation signals include electromagnetic navigation signals from a plurality of global positioning system (GPS) satellites.

10. The method of claim 1, wherein the determining of the discerned position includes:

at a first time when the device is disposed at a first position, measuring the first position and a velocity of the device using the electromagnetic navigation signals; and at a second time when the device is disposed at a different second position, subsequently extrapolating the first position and the velocity into the second position using an inertial navigation system, wherein the evolving position of the device includes the first position at the first time and the second position at the second time.

11. The method claim 1, wherein the determining of the discerned position includes determining the discerned position of the jamming antenna upon detecting the electromagnetic interference from the jamming antenna that immediately prevents measuring the evolving position using the electromagnetic navigation signals.

12. The method claim 1, wherein the determining of the discerned position includes determining whether the jamming antenna is stationary or moving after detecting the electromagnetic interference from the jamming antenna and before the electromagnetic interference prevents measuring the evolving position using the electromagnetic navigation signals.

13. The method of claim 1, wherein:

the determining of the discerned position of the at least one jamming antenna emitting the electromagnetic interference includes determining a respective discerned position for each of a plurality of jamming antennas emitting the electromagnetic interference; and the determining of the evolving position of the device while the electromagnetic interference prevents subsequently measuring the evolving position using the electromagnetic navigation signals includes:

measuring, at a subsequent position of the device, a respective bearing of the electromagnetic interference received at the device from each of the jamming antennas; and triangulating the subsequent position of the evolving position of the device at an intersection between or among a respective line for each one of the jamming antennas passing though the respective discerned position of the one of the jamming antennas at the respective bearing for the one of the jamming antennas.

14. A device for determining an evolving position of the device using electromagnetic interference, which is jamming a plurality of electromagnetic navigation signals, the device comprising:

an antenna arrangement with each of at least one antenna of the antenna arrangement for receiving both the electromagnetic navigation signals and the electromagnetic interference;

a detection circuit for determining a discerned position of at least one jamming antenna emitting the electromagnetic interference, the detection circuit for determining the discerned position from the electromagnetic interference received at the antenna arrangement and at least one measurement of the evolving position using the electromagnetic navigation signals received at the antenna arrangement; and an evaluation circuit for determining the evolving position of the device while the electromagnetic interference prevents subsequently measuring the evolving position using the electromagnetic navigation signals, the evaluation circuit for determining the evolving position from the electromagnetic interference received at the antenna arrangement and the discerned position of the at least one jamming antenna.

15. The device of claim 14, wherein:

each individual antenna of the at least one antenna of the antenna arrangement includes an array of elements; and the detection circuit is for matching a wavefront phase of the electromagnetic interference across the elements, the matched wavefront phase specifying a bearing of a line from the jamming antenna to the individual antenna, the bearing between the jamming and individual antennas including an azimuth angle and an elevation angle, the detection circuit for determining the discerned position of the jamming antenna from the bearing between from the jamming antenna and each individual antenna of the antenna arrangement and from the at least one measurement of the evolving position using the electromagnetic navigation signals received at the antenna arrangement.

16. The device of claim 14, further comprising:

a correlation circuit for measuring the at least one measurement, which includes a first and different second position for the evolving position of the device, the correlation circuit for measuring the first and second positions from the electromagnetic navigation signals received at the antenna arrangement from a plurality of global positioning system (GPS) satellites while the electromagnetic interference from at least one jamming antenna does not prevent measuring the first and second positions from the electromagnetic navigation signals.

17. The device of claim 15, wherein:
the at least one antenna of the antenna arrangement includes a first antenna disposed at the first position and a second antenna disposed at the second position, with the evolving position fixed relative to the first and second antennas;
the correlation circuit is for measuring the first position of the first antenna from the electromagnetic navigation signals received from the GPS satellites at the first antenna and for measuring the second position of the second antenna from the electromagnetic navigation signals received from the GPS satellites at the second antenna; and
the detection circuit is for measuring a first bearing of the electromagnetic interference received at the first antenna from the jamming antenna and a second bearing of the electromagnetic interference received at the second antenna from the jamming antenna, the detection circuit triangulating the discerned position of the jamming antenna at an intersection between a line though the first position of the first antenna at the first bearing and a line though the second position of the second antenna at the second bearing.

18. The device of claim 14, wherein the detection circuit is for measuring a first bearing of the electromagnetic interference received from the jamming antenna at the device disposed at a first position and for measuring a second bearing of the electromagnetic interference received from the jamming antenna at the device disposed at a second position, the detection circuit triangulating the discerned position of the jamming antenna at an intersection between a line though the first position at the first bearing and a line though the second position at the second bearing.

19. The device of claim 14, wherein the evaluation circuit is for measuring a bearing of the electromagnetic interference received from the jamming antenna at the device disposed at a subsequent position, the evaluation circuit triangulating the subsequent position of the evolving position of the device from the discerned position of the jamming antenna and a line at the bearing through the discerned position and the subsequent position.

20. The device of claim 14, further comprising:
an inertial navigation system for extrapolating a first position and a velocity of the device at a first time into the different second position at a second time, wherein the evolving position of the device includes the first position at the first time and the second position at the second time.

* * * * *